(12) United States Patent
Bazin et al.

(10) Patent No.: US 12,093,461 B2
(45) Date of Patent: Sep. 17, 2024

(54) MEASUREMENT BASED ON POINT SELECTION

(71) Applicant: Apple Inc., Cupertino, CA (US)

(72) Inventors: Jean-Charles Bernard Marcel Bazin, Sunnyvale, CA (US); Anselm Grundhoefer, Campbell, CA (US); Ivan Kolesov, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/668,868

(22) Filed: Feb. 10, 2022

(65) Prior Publication Data

US 2022/0261085 A1  Aug. 18, 2022

Related U.S. Application Data

(60) Provisional application No. 63/148,796, filed on Feb. 12, 2021.

(51) Int. Cl.
  *G06F 3/01* (2006.01)
  *G06F 3/03* (2006.01)
  *G06F 3/04815* (2022.01)

(52) U.S. Cl.
  CPC ............ *G06F 3/017* (2013.01); *G06F 3/0304* (2013.01); *G06F 3/04815* (2013.01)

(58) Field of Classification Search
  None
  See application file for complete search history.

(56) References Cited

U.S. PATENT DOCUMENTS

| 2009/0304232 A1 | 12/2009 | Tsukizawa |
| 2011/0035952 A1 | 2/2011 | Roithmeier |

(Continued)

FOREIGN PATENT DOCUMENTS

| CN | 101489467 | 7/2009 |
| CN | 102016756 | 4/2011 |

(Continued)

OTHER PUBLICATIONS

Chinese Patent Office; Chinese Office Action issued Sep. 29, 2023 which pertains to Chinese Patent Application No. 202210129772.X. 9 pages.

(Continued)

*Primary Examiner* — Parul H Gupta
(74) *Attorney, Agent, or Firm* — Thompson Hine LLP

(57) ABSTRACT

Various implementations disclosed herein include devices, systems, and methods that provide measurement techniques for electronic devices such as optical see-through head mounted devices. In some implementations, a line of sight technique is used to identify a 3D position of a measurement point to enable measurement of an object in a 3D environment. In some implementations, different measurement point identification techniques are automatically selected and used to identify a 3D position of a measurement point to enable measurement of an object in a 3D environment. In some implementations, a 3D position of a measurement point is identified to enable measurement of an object in a 3D environment, where the measurement point is identified by selecting from multiple candidates that are determined using different measurement point selection techniques.

20 Claims, 13 Drawing Sheets

(56) References Cited

U.S. PATENT DOCUMENTS

| | | | | |
|---|---|---|---|---|
| 2012/0242800 | A1* | 9/2012 | Ionescu | G06V 40/107 |
| | | | | 348/46 |
| 2014/0292648 | A1* | 10/2014 | Matsuda | G06F 3/04883 |
| | | | | 345/156 |
| 2015/0323998 | A1* | 11/2015 | Kudekar | G06F 1/163 |
| | | | | 345/156 |
| 2016/0147408 | A1 | 5/2016 | Bevis et al. | |
| 2016/0349925 | A1* | 12/2016 | Kamamori | G06F 3/04883 |
| 2017/0140216 | A1* | 5/2017 | Lin | G01B 11/285 |
| 2017/0364198 | A1* | 12/2017 | Yoganandan | G06F 3/04815 |
| 2018/0336733 | A1* | 11/2018 | Koga | G06T 7/60 |
| 2019/0242692 | A1 | 8/2019 | Saure et al. | |
| 2021/0131790 | A1 | 5/2021 | Tsurumi | |
| 2022/0012904 | A1 | 1/2022 | Li et al. | |

FOREIGN PATENT DOCUMENTS

| | | |
|---|---|---|
| CN | 106705837 | 5/2017 |
| CN | 107003728 | 8/2017 |
| CN | 107925727 | 4/2018 |
| CN | 108603749 | 9/2018 |
| CN | 109579745 | 4/2019 |
| CN | 110132129 | 8/2019 |
| CN | 110136190 | 8/2019 |
| CN | 111443802 | 7/2020 |
| CN | 111989537 | 11/2020 |
| KR | 10-2020-0011425 A | 2/2020 |
| KR | 10-2020-0035103 A | 4/2020 |
| WO | 2017/039907 A1 | 3/2017 |
| WO | 2019/204118 A1 | 10/2019 |

OTHER PUBLICATIONS

Korean IP Office, Korean Preliminary Rejection issued Feb. 5, 2024 (includes English Translation), which pertains to Korean Patent Application No. 10-2022-0018162. 17 pgs.

China National Intellectual Property Administration, Chinese Office Action issued Apr. 4, 2024, which pertains to Chinese Patent Application No. 202210129772X. 6 pgs.

* cited by examiner

MEASUREMENT BASED ON POINT SELECTION

CROSS-REFERENCE TO RELATED APPLICATIONS

This Application claims the benefit of U.S. Provisional Application Ser. No. 63/148,796 filed Feb. 12, 2021, which is incorporated herein in its entirety.

TECHNICAL FIELD

The present disclosure generally relates to electronic devices that provide measurements in 3D environments and, in particular, to systems, methods, and devices that provide measurements based on image sensor data and user input identifying measurement parameters.

BACKGROUND

Existing electronic devices allow users to measure an object's size (e.g., a distance between points) by tapping points on a touch screen display showing a physical environment. Improved measurement techniques may be beneficial, especially for electronic devices with alternative or additional input mechanisms that may be used to identify measurement parameters.

SUMMARY

Various implementations disclosed herein include devices, systems, and methods that provide measurements of a three-dimensional (3D) environment based on identifying 3D positions of one or more measurement points. For example, this may involve identifying starting and ending points of a measurement using a line of sight (LOS) technique (e.g., based on a line between a user's viewpoint and a finger that the user positions to indicate the locations of the points). In some implementations, a ray/line is extended from the 3D position of a viewpoint (e.g., the measuring eye or image sensor) through a 3D position of the user's fingertip and a 3D measurement point is identified based on where the line intersects a 3D environment (e.g., the physical environment).

Various implementations disclosed herein include devices, systems, and methods that provide measurements of a three-dimensional (3D) environment based on selecting a point identification technique to use to identify a 3D position of a measurement point. In some implementations, this involves selecting and/or switching between a finger touching measurement technique and a finger line-of-sight measurement technique. In some implementations, the point identification technique is selected or switched based on an assessment of physical proximity.

Various implementations disclosed herein include devices, systems, and methods that provide measurements of a three-dimensional (3D) environment based on identifying a 3D position of a measurement point, where a measurement point is identified by selecting from multiple targets (e.g., candidate measurement points) that are determined using different point selection techniques (e.g., measurement techniques). In some implementations, the selection among the multiple targets is based on an evaluation of likelihood that each different target is the 3D position of the actual measurement point, e.g., based on an assessment of which target is intended by the user.

In some implementations, at an electronic device having a processor, a method includes determining a 3D position of a finger in a 3D environment, and determining a 3D position of a viewpoint, wherein the 3D environment is viewed based on the viewpoint. In some implementations, a direction in the 3D environment is determined based on the 3D position of the viewpoint and the 3D position of the finger. Then, a 3D position of a measurement point in the 3D environment is determined based on the direction, and a measurement is provided based on the 3D position of the measurement point.

In some implementations, at an electronic device having a processor, a method includes detecting a finger in a 3D environment and determining a state of the finger based on an image of the 3D environment. In some implementations, a point identification technique is selected to identify a 3D position of a measurement point based on the state of the finger. Then, the 3D position of the measurement point is identified based on the selected point identification technique and the image of the 3D environment, and a measurement is provided based on the 3D position of the measurement point.

In some implementations, at an electronic device having a processor, a method includes receiving an image of a physical environment. In some implementations, a plurality of targets is identified, wherein each of the plurality of targets is identified based on a different point identification technique, wherein at least one of the point identification techniques is based on the image of the physical environment. Then, a 3D position for a measurement point is selected based on selecting a target of the plurality of targets, wherein the target is selected based on evaluating 3D positions of the plurality of targets, and a measurement is provided based on the selected 3D position of the measurement point.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
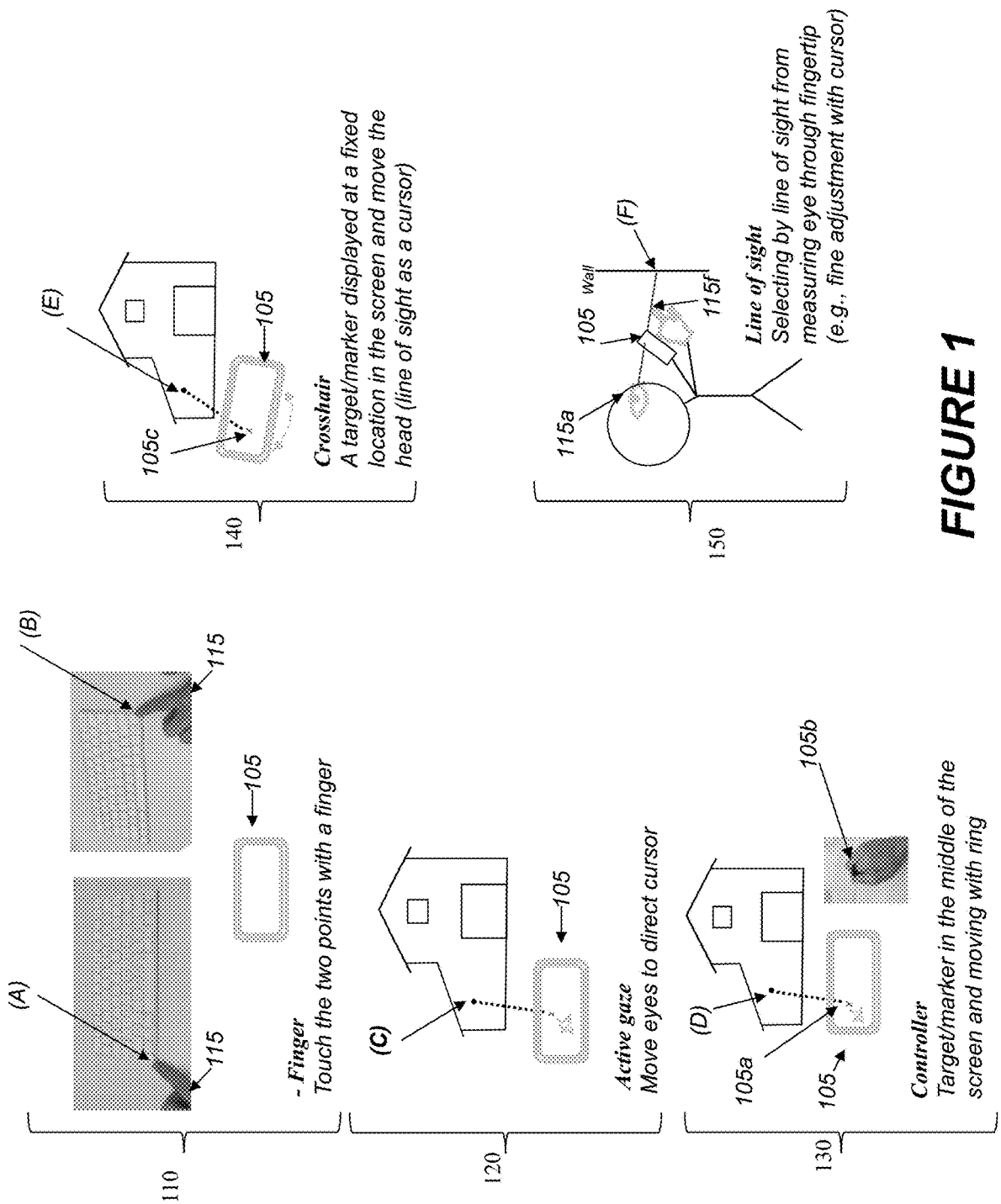
FIG. 1 illustrates exemplary measurement techniques for use via an electronic device in a 3D environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Various implementations disclosed herein include devices, systems, and methods that provide measurements of a 3D environment via electronic devices such as smartphones, tablets, and other mobile electronic devices. For example, techniques disclosed herein may be implemented on electronic devices that provides views or video of a physical environment. In some implementations, a line of sight technique is used to identify a 3D position of a measurement point to enable measurement of an object in a 3D environment. In some implementations, different measurement point identification techniques are automatically selected and used to identify a 3D position of a measurement point to enable measurement of an object in a 3D environment. In some implementations, a 3D position of a measurement point is identified to enable measurement of an object in a 3D environment, where the measurement point is identified by selecting from multiple candidates that are determined using different measurement point selection techniques.

FIG. 1 illustrates exemplary measurement techniques for use by an electronic device in a 3D environment in accordance with some implementations. As shown in FIG. 1, exemplary approaches include (a) a finger-touching measurement technique 110, (b) an active gaze-based measurement technique 120, (c) a controller-based measurement technique 130, (d) a fixed crosshair-based measurement technique 140, and (e) a line of sight-based measurement technique 150. In some implementations, an electronic device 105 used. In some implementations, sensors of the electronic device 105 are used to implement the exemplary measurement techniques 110-150. In some implementations, the electronic device 105 is a mobile electronic device such as a smartphone, tablet, or the like. While the techniques disclosed herein are described and illustrated with reference to the electronic device 105, any types of electronic devices that provide views of a 3D environment may be used in alternative implementations described herein.

In some implementations, the measurement techniques 110-150 use a first indication and a second indication to select a pair of measurement points. In some implementations, the measurement techniques 110-150 use a temporal indication and a spatial indication to select measurement points. The measurement techniques 110-150 use measurement points to output a measurement to a user 115 of the electronic device 105. In some implementations, the measurement is a distance to an object from the user 115. In some implementations, the measurement is the distance between a first measurement point and a second measurement point (e.g., marking the two opposing sides of a single object or respective points on two different objects) in a 3D environment. In some implementations, the measurement is the area of a surface or a volume defined by a plurality of measurement points.

As shown in FIG. 1, an example voice-assisted finger touching measurement technique 110 is performed using the electronic device 105. First, a user 115 moves to see and touch a first point A on a physical object (e.g., a corner of keyboard) and says "Virtual Assistant, please measure from here . . . ". Second, the user 115 moves to see and touch a second point B on the physical object and says "to here". A measurement function on the electronic device 105 identifies measurement points using sensors that provide data from which user input is identified. For example, the verbal commands can trigger assessment of image data (of the user's finger and physical environment) at corresponding points in time. The measurement function may determine various measurements such as the distance between point A and point B and provide (e.g., visually, audible, etc.) that distance to the user 115.

As shown in FIG. 1, an example voice-assisted active gaze measurement technique 120 is performed using the electronic device 105. In one implementation, first the user 115 says "Virtual Assistant, please use active gaze measurement to measure a distance to here" and selects a measurement point by looking at a target point (e.g., point C). A gaze direction of the user 115 (e.g., a measuring eye) is determined (e.g., via image sensors capturing images of the user eye(s)). A marker, point C, may be displayed indicating where the gaze direction intersects the 3D environment. The gaze direction is used to determine the 3D coordinates of the measurement point C. A measurement function on the electronic device 105 determines the distance to the point C 3D coordinates and provides that distance to the user 115. For example, the distance may be provided as a virtual object, for example, visually (e.g., a number with units above a dashed line extending to the point C) or presented as audible output. In some implementations, gaze measuring techniques 120 uses stereo active gaze (e.g., both eyes).

In some implementations, the measurement includes distance, surface area, volume, etc. Further, feedback to the user may be provided in various ways for any described measurement technique (e.g., 110-150). In some measurement techniques, feedback during actions to achieve the measurement may be provided visually or as an audible output to the user. In some measurement techniques, each measurement point may be confirmed using feedback (e.g., any combination of visual, audible, haptic or temporal indication).

As shown in FIG. 1, an example controller-based measurement technique 130 uses both a directional indication and a selection indication (e.g., temporal). In some implementations, controller-based measurement techniques 130 display a target or marker 105*a* in a preset position (e.g., a center position) of a display of the electronic device 105 and then measurement points are selected by moving the marker 105*a* and selecting one or more measurement points (e.g., point D) with a controller 105*b*. For example, the controller 105*b* could be a device capable of being held or placed on a finger/thumb of the user 115. In some implementations, the controller 105*b* provides controlled movement in one direction, controlled movement in two directions, and a selection mechanism (e.g., click for yes or no; one or more taps, pressure sensitive; etc.). In one implementation, the controller 105*b* is a type of joystick. In one implementation, the marker 105*a* is a virtual object.

As shown in FIG. 1, an example fixed crosshair-based measurement technique 140 uses a temporal indication (e.g., voice) and a physical indication (e.g., fixed crosshair). In some implementations, crosshair-based measurement techniques 140 display a visual augmentation or marker 105*c* in a fixed position of a display of the electronic device 105. In some implementations, the gaze direction is fixed. In some implementations, measurement points are then selected by the user 115 moving their head so that the marker 105*c* gets aligned with a measurement point to select (e.g., line of sight with a fixed cursor to select point E). In some implementations, any visual, audible, haptic or temporal indication can be used to select the point E. In some implementations, rotational movement of the head is sufficient to select measurement points.

As shown in FIG. 1, an example voice-assisted line of sight (LOS)-based measurement technique 150 is performed using the electronic device 105. In one implementation, first the user 115 says "Virtual Assistant, please measure a distance to here" and selects an object or measurement point F by aligning a fingertip 115*f* to a measurement point (e.g., point F) using a measuring eye 115*a* when speaking the word "here".

In some implementations, the LOS-based measurement techniques 150 use absolute positioning LOS where the finger 115*f* directly identifies a measurement point in the 3D environment (e.g., the line through the finger intersects the 3D environment). In some implementations, the LOS-based measurement techniques 150 use relative positioning LOS where a cursor in space is provided and the finger 115*f* is used to adjust the position of (e.g., fine tune) the cursor in space. Thus, a line extending from the measuring eye 115*a* though the cursor (e.g., adjusted left, right, closer, further, up, or down by the finger 115*f*) intersects the 3D environment to determine 3D coordinates of the measurement point F. A measurement function on the electronic device 105 determines the distance to the point F 3D coordinates and provides that distance to the user 115.

Figure 2:
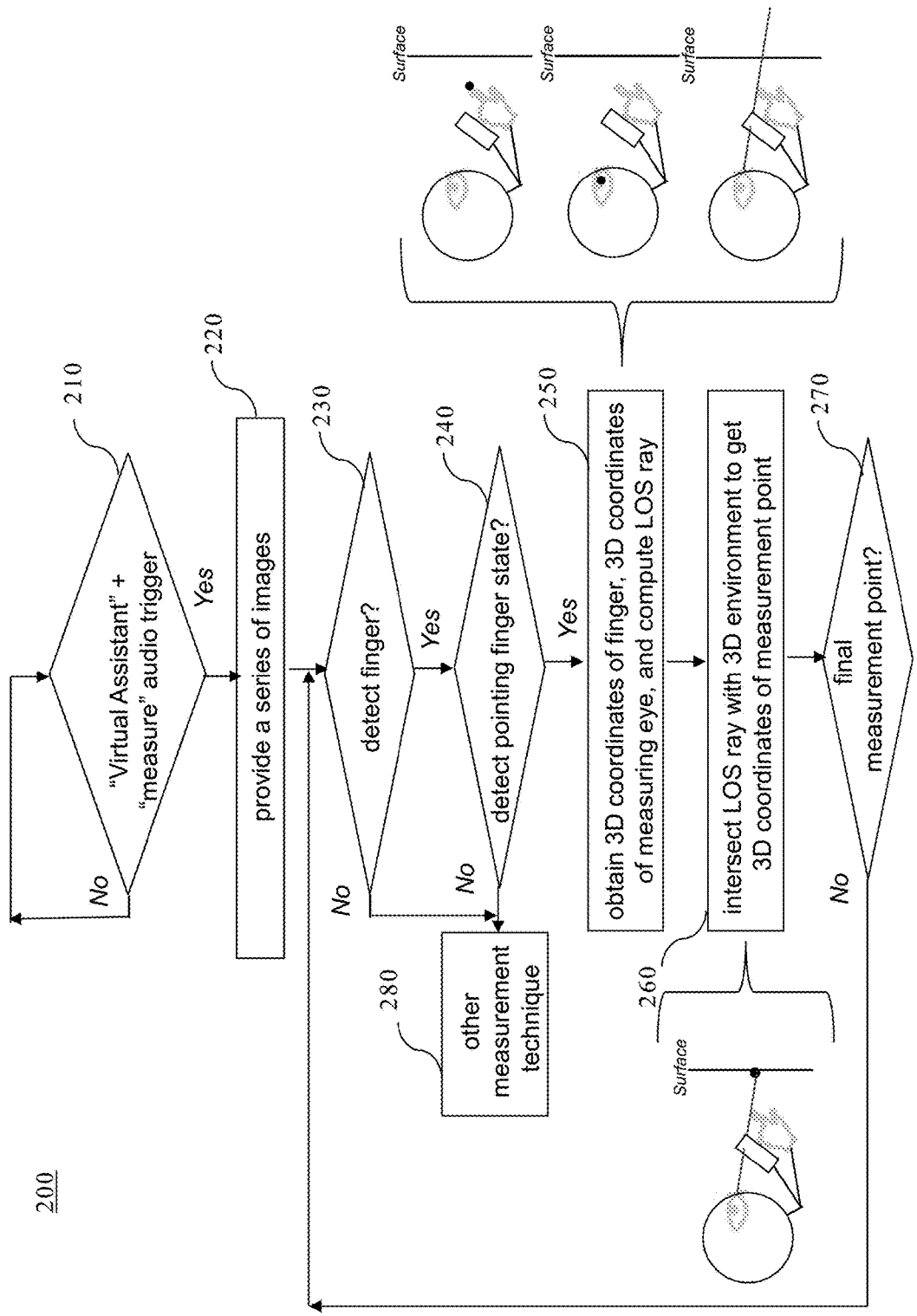
FIG. 2 is a flowchart illustrating an exemplary method of identifying a 3D position of a measurement point using a line of sight technique to enable measurement of an object in a 3D environment in accordance with some implementations.

FIG. 2 is a flowchart illustrating an exemplary method of identifying a 3D position of a measurement point using a line of sight (LOS) technique to enable measurement of an object in a 3D environment (e.g., identifying distance to an object or a distance between two points) by an electronic device. In some implementations, a line is extended from a 3D position of a viewpoint (e.g., a measuring eye) through a 3D position of the electronic device user's fingertip and the 3D position of the measurement point is identified based on where the line intersects the 3D environment. In some implementations, a 3D environment includes a physical environment or an XR environment.

At block 210, the method 200 continuously monitors for the initialization of a measurement technique or a measurement application. In some implementations, the user of the electronic device says, "Virtual Assistant, I want to measure X", where X is a distance to an object, a distance between two different points or objects, a surface area, a volume, or the like. In some implementations, the detection of the measurement audio trigger of "Virtual assistant" and "measure" (e.g., by the electronic device or Virtual Assistant) starts a measurement capability at the electronic device. For example, the user may say "Virtual Assistant, I want to measure from here to there" so that two measurement points are needed and the user's finger is moved between a first measurement time when "here" is said and a second measurement time when "there" is said. As shown in FIG. 2, upon detection of the audio trigger (e.g., block 210, returns yes), the method 200 continues to block 220. When the measurement audio trigger is not detected at block 210, the method 200 continues to monitor for the audio trigger (e.g., block 210, returns no). In some implementations, the method 200 monitors only under prescribed conditions for the measurement audio trigger at block 210. In some implementations, other techniques may be used to trigger a measurement technique. For example, preset gestures, input devices, input techniques, etc. may be used to trigger the measurement technique.

At block 220, the method 200 provides a series of images from at least an image sensor at the electronic device. In some implementations, the image sensor is not enabled until block 220 of the method 200. In some implementations, the image sensor is an outward facing camera. For example, the series of images is a camera stream from a forward facing RGB-D camera. In another example, the series of images is from a stereo pair of image sensors.

At block 230, the method 200 detects a finger (e.g., fingertip) of the user of the electronic device in the series of images. As shown in FIG. 2, upon successful detection of the finger (e.g., block 230, returns yes), the method 200 continues to block 240. At block 230, detection of the finger is implemented using various image processing techniques. In one implementation, stereo vision from stereo image sensors provides the detection and the 3D coordinate of the fingertip of the finger. In another implementation, machine learning classification is used to identify and track the finger in the series of images. Additional image processing techniques for detecting the finger include but are not limited to template (e.g., finger or fingertip) matching, skin detection, hand detection, and hand or finger(s) tracking. In some implementations, the series of images (e.g., combined with data from other sensors) at the electronic device are used to track a pose (e.g., position and orientation) of the finger using depth data or vision-based localization such as VIO, SLAM or the like.

At block 240, the method 200 detects a state of the finger (e.g., fingertip) of the user of the electronic device in the series of images. Generally, the user of the electronic device can use their finger either to touch an object (e.g., close by objects) or to point at an object (e.g., far away objects). For example, the user's finger may be used to touch the corner of a book within reach of the user. In another example, the user's finger may be used to point at the top of the Washington Monument. Accordingly, in some implementations, the state of the finger or fingertip can be either touching or pointing. In some implementations, the pointing state of the finger may be determined at block 240 by image processing techniques analyzing the detected finger in the series of images. For example, the shape of the finger may be determined to be a pointing shape. In some implementations, the pointing state of the finger may be determined using depth analysis of the 3D environment. For example, there may not be any objects within a threshold spatial distance of the finger in the 3D environment. In another example, any detected objects in the 3D environment are far away (e.g., more than 2 feet or a pointing distance threshold). In other words, the detected finger is not touching any object in the 3D environment. In some implementations, the series of images (e.g., combined with data from other sensors) are used to track a pose of the finger in the 3D environment using depth data or vision-based localization to determine the pointing state of the finger. In some implementations, the pointing state of the finger may be determined using semantic information about the 3D environment. Additional techniques may be used to detect the finger state, see for example, block 440. When the method 200 at block 240 determines the state of the finger is the pointing state, the method 200 continues to block 250.

At block 250, the method 200 obtains the 3D coordinates of the finger or fingertip and the 3D coordinates of a "measuring" eye of the user of the electronic device. In some implementations, the 3D coordinates of the fingertip are determined using the same techniques used to detect the finger state at block 240 or to detect the finger at block 230. In some implementations, the 3D coordinates of the fingertip may be determined when the finger state is detected at block 240 or when the finger is detected at block 230. In some implementations, the measuring eye is determined by an inward facing image sensor at the electronic device. For example, when one eye is open and the other eye is closed, an image from the inward facing image sensor determines the open eye to be the measuring eye. In some implementations, preset information is used to determine the measuring eye. For example, the dominant eye may be preset as the measuring eye of the user. Alternatively, the measuring eye is preset in a registration process of the measurement capability on the electronic device. In some implementations, the measuring eye has a known spatial relationship to the electronic device. Then, at block 250 the method 200 computes a line of sight (LOS) ray (e.g., a 3D line) extending from the 3D coordinates of the measuring eye through the 3D coordinates of the fingertip into the 3D environment.

In some implementations, the 3D coordinates of the finger are obtained only when the finger is stationary or stable. In one implementation, when the user says "here" and the finger is stable, feedback may be provided to the user. For example, when the user says "here" and motion by the finger is under a threshold, a cursor may be displayed at the 3D location of the fingertip as visual feedback to the user. In another example, the cursor is displayed when the finger is stable for a preset time period or 3 seconds. In some implementations, once the cursor is displayed at the 3D coordinates of the fingertip, the user may then use their finger to fine tune the 3D positioning of the cursor (e.g., move slightly left/right or up/down). In yet another example, an error message (e.g., please hold finger still) can be displayed when the finger is not stable. In some implementations, the motion of the image sensor needs to be subtracted from the motion of the finger to determine whether the finger is stable (e.g., under a motion threshold).

In some implementations, the fingertip is the tip of the rounded portion of the finger. In some implementations the fingertip is determined by color or shape analysis of the series of images. In one implementation, the 3D coordinates of the fingertip are determined by using two cameras and stereo imaging techniques (e.g., triangulation) to determine the 3D position. In another implementation, the 3D coordinates of the fingertip are determined using one or more 2D images and corresponding depth information (e.g., using one or more depth sensors) for each pixel in the 2D image. In some implementations, other definitions for the fingertip of the finger are used. For example, a center point of the last 2 centimeters of the finger may be defined as the fingertip. Alternatively, a 1 millimeter distance beyond the axial tip of the finger may be defined as the fingertip.

At block 250, the fingertip may be relatively large compared to the 3D environment and visual feedback may provided at the 3D coordinates of the fingertip for a more accurate 3D position of the fingertip. For example, an adjustable virtual marker (e.g., cursor) may be shown to the user at the 3D coordinates of the fingertip. In some implementations, preceding images or subsequent images are used to adjust the 3D coordinates of the fingertip.

At block 260, the method 200 detects an intersection of the LOS ray with the 3D environment. In some implementations, the intersection of the LOS ray with the 3D scene provide a 3D coordinate of a measurement point, which may be a first measurement point, for example, used to measure a distance between two objects. In some implementations, because the fingertip occludes a desired measurement point during selection or positioning of the desired measurement point (e.g., determining the 3D coordinates of the fingertip) additional analysis may be used. In some implementations, the measurement point is snapped to a particular feature occluded by the fingertip (e.g., the 3D coordinates of a particular feature that is near/nearly aligned with the originally calculated fingertip 3D coordinates). For example, a measurement point may be snapped to an edge or corner that is covered by the fingertip and very near the fingertip 3D coordinates (e.g., within a threshold spatial distance). In one implementation, semantic information for objects covered by the fingertip may be used to snap the position of the measurement point (e.g., to be on the edge between two different objects) occluded by the fingertip. In one implementation, computer vision techniques may be used to identify/select a measurement point that is more difficult to visually align. For example, the fingertip may be used to trace a circle, and an object within the circle such as an edge or corner may be identified as the measurement point. In some implementations, preceding images or subsequent images after the measurement point positioned by the fingertip are used to supply additional information to snap or adjust the measurement point to a position of higher confidence. In some implementations, data from additional sensors is used to resolve or snap measurement points. For example, gaze detection could be used to resolve a measurement point between a pixel on the edge of a desk or an adjacent pixel on the floor based on whether the gaze intersects at the closer depth of the desk or the further depth of the floor.

In some implementations, blocks 230, 240, 250, and 260 may be repeated to obtain additional measurement points as needed to measure a distance, surface or volume. Alternatively, blocks 250 and 260 may be repeated to obtain additional measurement points to measure a distance, surface or volume. In some implementations, feedback is provided to the user as each measurement point is determined. For example, when the measurement is a distance between two objects, the first measurement point is visually displayed to the user, then the second measurement point is displayed, and finally a line between the two measurement points is displayed. In this example, when the line between the two measurement points is displayed, the distance between the two measurement points is provided (e.g., visually or audibly) to the user. When the final measurement point is obtained in block 260, the image sensor is disabled.

At block 270, the method 200 determines whether all measurement points have been obtained to provide the measurement requested by the user. As shown in FIG. 2, when a current measurement point is not the final measurement point, the method 200 returns to block 230.

As shown in FIG. 2, when the method 200 is unsuccessful at block 230 or at block 240, the method 200 continues to block 280 where other measurement techniques are used. Various other measurement techniques are described herein, for example, with respect to FIG. 1.

Figure 3:
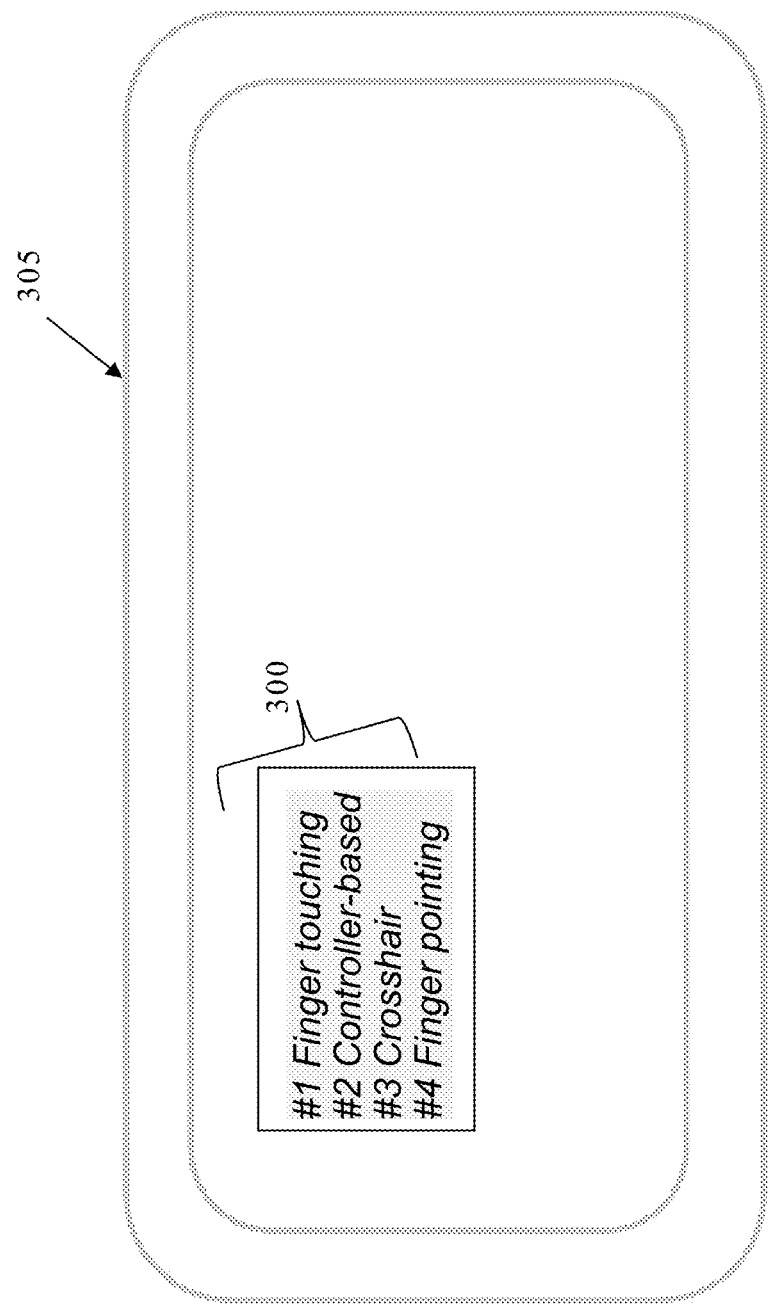
FIG. 3 illustrates an exemplary approach to selecting among measurement techniques in a 3D environment in accordance with some implementations.

FIG. 3 illustrates an exemplary approach to selecting among measurement techniques at an electronic device in a 3D environment in accordance with some implementations. In some implementations, when the virtual assistant at an electronic device is triggered to perform a measurement, selection among the available measurement techniques is needed. As shown in FIG. 1, example measurement techniques include the finger-touching measurement technique 110, the active gaze-based measurement technique 120, the controller-based measurement technique 130, the fixed crosshair-based measurement technique 140, and the line of sight-based measurement technique 150.

As shown in FIG. 3, once the measurement capability at the electronic device is initiated (e.g., block 210, returns yes), a measurement technique selection menu 300 is provided to the user of an electronic device 305. Various user interface techniques may be used to select one of the measurement techniques in the selection menu 300. Once the measurement technique is selected, the measurement points are determined using the selected measurement technique, and the measurement is provided to the user of the electronic device 305. In some implementations, only the measurement techniques available at the electronic device 305 are listed in the selection menu 300. In some implementations, not all measurement techniques are available on the electronic device 305 because the hardware or software required to implement the measurement technique is not on the electronic device 305. As shown in FIG. 3, active gaze tracking is not included on the electronic device 305, and the active gaze-based measurement technique 120 is not listed in the selection menu 300. In some implementations, other techniques may be used to select types of measurements (e.g., distance to an object, distance between objects, surface area, volume, or even changes in measurements over time). For example, specific spoken phrases or hand gestures may correlate to types of measurements. In some implementations, measurement points are selected by gestures of the user. In some implementations, the measurement technique may be specifically identified by the user of the electronic device 305. For example, the user may say "Hey, Virtual Assistant, use active gaze measurement to measure the distance from here . . . , to there".

Figure 4:
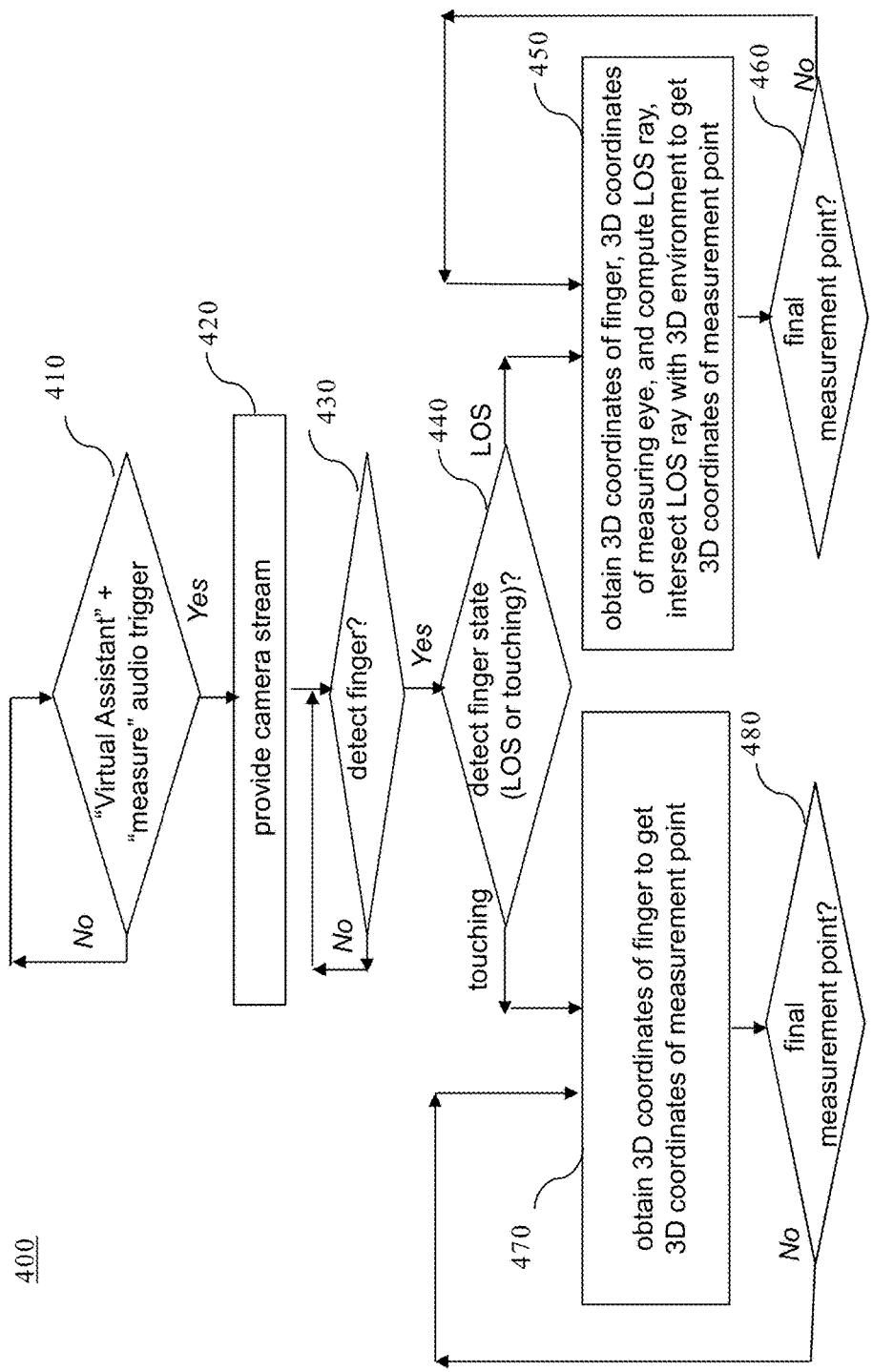
FIG. 4 illustrates another exemplary approach to selecting among measurement techniques in a 3D environment in accordance with some implementations.

FIG. 4 illustrates an exemplary approach to selecting among measurement techniques in a 3D environment in accordance with some implementations. In some implementations, different measurement point identification techniques are automatically selected and used to identify a 3D position of a measurement point to enable measurement of an object in a 3D environment. In some implementations, the point identification technique may select/switch between a first finger touching measurement technique and a second line-of-sight measurement technique. In some implementations, the point identification technique is selected or switched based on image analysis of the 3D environment, spatial analysis of the 3D environment, or semantic understanding of the 3D environment.

At block 410, the method 400 monitors for the initialization of a measurement application. In some implementations, the user of an electronic device says, "Virtual Assistant, I want to measure X", where X is a distance to an object, a distance between two different points, a surface area, a volume, etc. In some implementations, the electronic device is a head mounted device (HMD). In some implementations, the detection of the measurement audio trigger by detecting both "Virtual assistant" and "measure" within a preset time interval starts a measurement application at the electronic device. For example, the user may say "Virtual Assistant, I want to measure the surface area of that table" so that the input by the user such as a preset number of measurement points is needed. Alternatively, in this example, another approach uses semantic information (e.g., run semantic segmentation in the image streams, detect the table and measure its surface) to provide the measurement to the user. Additionally, in this example when there is more than one table in the field of view, the user could choose other selection techniques (e.g., touch (or be asked to touch), point, voice, etc.) to indicate the table of interest. In some implementations, the finger of the user of the electronic device is used to input the measurement points. As shown in FIG. 4, block 410 is repeated when the audio trigger is not detected (e.g., block 410, returns no). Otherwise, upon detection of the audio trigger (e.g., block 410, returns yes), the method 400 continues to block 420.

At block 420, the method 400 provides a series of images from at least an image sensor at the electronic device. For example, the series of images is a continuous camera stream from an array of outward facing RGB-D cameras providing images for up to 360° around the electronic device. In another example, the series of images is from a forward facing camera. In some implementations, the series of images is provided until the final measurement point is obtained.

At block 430, the method 400 detects a finger (e.g., fingertip) of the user of the electronic device in the series of images. In some implementations, detection of the finger in the series of images is implemented using various image processing techniques. In one implementation, stereo image sensors may be provided and the stereo vision provides detection and tracking (e.g., triangulation) of the fingertip of the finger. Additional image processing techniques for detecting the finger may be used, see for example, block 230. In some implementations, additional images of the 3D environment are provided when the finger is not detected (e.g., block 430, returns no). As shown in FIG. 4, upon successful detection of the finger (e.g., block 430, returns yes), the method 400 continues to block 440.

Generally, the user of the electronic device can use their finger either to touch an object (e.g., close by object) or to point at an object (e.g., far away object).

At block 440, the method 400 detects a state of the finger (e.g., fingertip) of the user of the electronic device in the series of images. For example, the user's finger touches the corner of a book or points to a top of a building. When the method 400 at block 440 determines the state of the finger is a LOS pointing state, the method 400 continues to block 450 (e.g., LOS finger measurement technique). When the method 400 at block 440 determines the state of the finger is the touching state, the method 400 continues to block 460 (e.g., touching finger measurement technique).

At block 440, the method 400 determines whether the state of the finger is in the air or contacting a surface (e.g., LOS pointing or touching) by using one or more of the following techniques or combinations thereof. In some implementations, machine learning based classification may be trained to output "touching" or "pointing" based on an input image or images. In some implementations, the appearance and positioning of the finger is used to determine whether the finger is a LOS pointing finger or a finger touching a surface because a finger pointing is different in appearance, geometry, positioning, etc. relative to a touching finger. In some implementations, shadow detection may be used because the finger or fingertip's shadow will "touch" the finger when the finger touches the surface of an object. In some implementations, depth information, skin geometry deformation or skin color modification (e.g., may be a lighter color) when the finger is touching the surface of an object. In some implementations, the determination of the state of the finger uses an estimate of whether the surface or object of interest is close or far (e.g., within a person's reach or distance threshold). In some implementations, the series of images (e.g., combined with data from other sensors) at the electronic device are used to track a pose (e.g., position and orientation) or motion of the finger in the 3D environment using vision-based localization such as VIO, SLAM or the like. In some implementations, methods of depth estimation are used to evaluate the surface or object of interest. In some implementations, the depth of the 3D environment around the fingertip and the fingertip depth itself may be compared. Further, the depth obtained will depend on the sensors available, such as monocular camera, stereo camera, active depth sensors, and a number and arrangement of the same. In one implementation, depth estimation from 3D gaze tracking is used. In some implementations, semantic information about the 3D environment determines the state of the detected finger.

At block 450, the method 400 obtains the 3D coordinates of the finger and the 3D coordinates of a "measuring" eye. In some implementations, the 3D coordinates of the finger are obtained only when the finger is stationary or stable. In some implementations, a cursor may be displayed at the 3D location of the fingertip as visual feedback to the user. In some implementations, the finger may then be used to fine tune the 3D positioning of the cursor (e.g., move slightly left/right or up/down). In some implementations, the 3D coordinates of the fingertip are used as the 3D coordinates of the finger. In some implementations, the fingertip is the tip of the rounded portion of the finger. In some implementations the fingertip is determined by color or shape analysis of the series of images. In some implementations, the measuring eye (e.g., open) is determined by an inward facing image sensor at the electronic device. In some implementations, preset information is used to determine the measuring eye (e.g., dominant eye). Then, at block 450 the method 400 computes a line of sight (LOS) line (e.g., a 3D line) extending from the measuring eye through the fingertip into the 3D environment and detects an intersection of the LOS ray with the 3D environment. In some implementations, the intersection of the LOS ray with the 3D scene provides the 3D coordinates of a measurement point, which may be a first measurement point, for example, used to measure a distance between two objects. Additional techniques for performing block 450 may be used, see for example, blocks 250-260.

At block 460, the method 400 determines whether all measurement points have been obtained to provide the measurement requested by the user. In some implementations, when a current measurement point is not the final measurement point, the method 400 returns to block 450. When the determination is made in block 460 that the final measurement point is obtained, the image sensor is disabled.

At block 470, the method 400 obtains the 3D coordinates of the finger as the 3D coordinate of a measurement point, which may be a first measurement point, for example, used to measure a distance between two objects. In some implementations, the 3D coordinates of the fingertip are used as the 3D coordinates of the finger. Additional techniques for performing block 470 may be used, see for example, blocks 250-260.

At block 480, the method 400 determines whether all measurement points have been obtained to provide the measurement requested by the user. In some implementations, when a current measurement point is not the final measurement point, the method 400 returns to block 470. When the determination is made in block 480 that the final measurement point is obtained, the image sensor is disabled. In some implementations, only a LOS finger measurement technique or a touching finger measurement technique is available for the method 400.

In some implementations, block 450 and block 470 may be repeated to obtain additional measurement points as needed to measure a distance, surface or volume. In some implementations, feedback is provided to the user as each measurement point is determined. For example, when the measurement is a distance between two objects, the first measurement point is visually displayed to the user, then the second measurement point is displayed, and finally a line between the two measurement points is displayed. In this example, when the line between the two measurement points is displayed, the distance between the two measurement points is provided (e.g., visually or audibly) to the user.

Another exemplary approach to implementing measurement techniques in a 3D environment in accordance with some implementations initiates all possible measurement techniques, generates a candidate 3D position from each measurement technique, and then evaluates a likelihood that each candidate 3D position among the candidate 3D positions is the actual measurement point. This approach does not try to immediately or quickly identify the measurement technique being used. Instead, a plurality of candidate 3D positions from corresponding measurement techniques are concurrently generated and then evaluated. In some implementations, the likelihood is based on one or more images of a 3D environment from an image sensor of an electronic device. In some implementations, the likelihood includes but is not limited to location in an image of the 3D environment (e.g., center is more likely), determination that there is a finger in the 3D environment, determination that the finger is touching an object or pointing to an object in the 3D environment, determination that a depth of the 3D environment is close or far away (e.g., greater than a person's reach), determination that a user's hand moving a little or a lot, determination that only one or both eyes of a user are open, semantic information about the 3D environment, geometry of the 3D environment, or any combination thereof.

Figure 5:
FIG. 5 illustrates yet another exemplary approach to selecting among measurement techniques in a 3D environment in accordance with some implementations.

FIG. 5 is a diagram that illustrates a plurality of target measurement points generated by different measurement techniques in accordance with some implementations. As shown in FIG. 5, an image of a 3D environment includes a plurality of candidate measurement points generated by corresponding measurement techniques after a measurement capability has been initiated at an electronic device. An image 500 of a 3D environment includes a target 3D point T110 generated using the finger-touching measurement technique 110, a target 3D point T120 generated using the active gaze-based measurement technique 120, a target 3D point T130 generated using the controller-based measurement technique 130, a target 3D point T140 generated using the fixed crosshair-based measurement technique 140, and a target 3D point T150 generated using the line of sight-based measurement technique 150. In some implementations, the measurement point is automatically selected among the target points T110-T150 and only the measurement point is shown to the user. Further, the user may provide feedback verifying the automatically selected measurement point. In some implementations, candidate measurement points by corresponding measurement techniques 110-150 are generated for additional measurement points (e.g., a second or third measurement point) before a specific measurement technique is selected.

Figure 6:
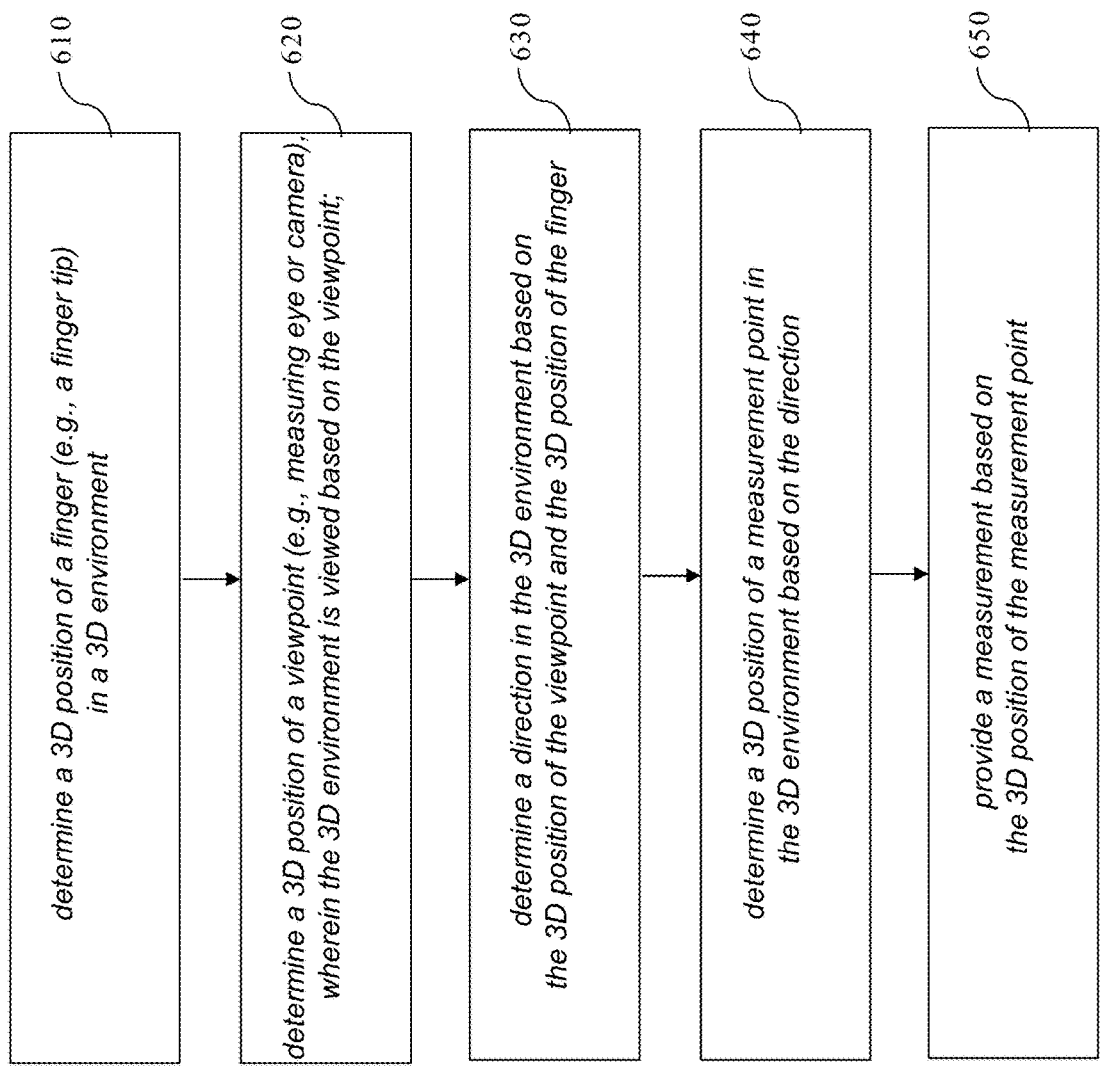
FIG. 6 is a flowchart illustrating an exemplary method of identifying a 3D position of a measurement point using a line of sight technique to enable measurement of an object in a 3D environment in accordance with some implementations.

FIG. 6 is a flowchart illustrating an exemplary method of identifying a 3D position of a measurement point using a LOS technique to enable measurement of an object in a 3D environment. In some implementations, a ray/line is extended from the 3D position of a viewpoint (e.g., the measuring eye or image sensor) through a 3D position of the user's fingertip and the 3D measurement point is identified based on where the line intersects a 3D environment (e.g., the physical environment).

At block 610, the method 600 determines the 3D position of a finger (e.g., a fingertip) in a 3D environment. In some implementations, the finger is detected in an image. In some implementations, the finger is detected in a series of images or an image stream/video. In some implementations, the 3D position of the finger is determined by detecting the finger in an image of the 3D environment based on color, shape, or connection to an arm or wrist. In some implementations, the finger is detected in one or more images based on machine learning classification, template (fingertip) matching, skin detection, hand detection, depth information, and/or hand/finger tracking. In some implementations, one or more hand gestures may be used to detect the finger.

In some implementations, the image sensors are conventional cameras (e.g., RGB cameras). In some implementations, the images of the object are obtained by a plurality of image sensors at the same time. Additional techniques for determining the 3D position of the finger may be used, see for example, block 250.

At block 620, the method 600 determines a 3D position of a viewpoint, wherein the 3D environment is viewed based on the viewpoint. In some implementations, the viewpoint is a measuring eye of a user of the electronic device or an image sensor on the electronic device. In some implementations, the position of the measuring eye may be determined based an inward facing sensor (e.g., on a smartphone or tablet). In some implementations, one of the user's eyes may be selected as the measuring eye based on the eye being open, the eye being the dominant eye of the user, or the eye being preselected (e.g., during initialization). In some implementations, the position of the image sensor (e.g., measuring camera) of a mobile device may be determined based on tracking the position of the mobile device via movement and/or image sensors capturing images of the environment. Additional techniques for determining the 3D position of the viewpoint may be used, see for example, block 250.

At block 630, the method 600 determines a direction in the 3D environment based on the 3D position of the viewpoint and the 3D position of the finger. In some implementations, a line may be drawn that starts from the viewpoint, passes through the fingertip, and extends into the physical environment. In some implementations, a 3D line may be drawn that starts from the 3D position of the measuring eye, passes through the 3D position of the fingertip, and extends into the physical environment. In some implementations, a 3D line may be drawn that starts from the 3D position of the measuring camera, passes through the 3D position of the fingertip, and extends into the physical environment. Additional techniques for determining the direction in the 3D environment based on the 3D position of the viewpoint and the 3D position of the finger may be used, see for example, block 250.

At block 640, the method 600 determines a 3D position of a measurement point in the 3D environment based on the direction. In some implementations, the 3D position of the measurement point is based on determining where the 3D line intersects an object in the 3D environment. Additional techniques for determining the 3D position of a measurement point based on the direction may be used, see for example, block 250.

At block 650, the method 600 provides a measurement based on the 3D position of the measurement point. In some implementations, the measurement is a distance to the object (e.g., intersection) from the eye. In some implementations, the measurement is the distance between the point and another point. In some implementations, the measurement is the area of a surface defined by the point and additional measurement points. In some implementations, the measurement is the volume defined by the point and a plurality of other points. In some implementations, a set of a plurality of measurement points is determined, and the set of measurement points is used to provide the measurement.

In some implementations, blocks 610, 620, 630, and 640 may be repeated to obtain additional measurement points as needed to measure a distance, surface or volume. In some implementations, feedback is provided to the user as each measurement point is determined. For example, when the measurement is a distance between two objects, the first measurement point is visually displayed to the user, then the second measurement point is displayed, and finally a line between the two measurement points is displayed. In this example, when the line between the two measurement points is displayed, the distance between the two measurement points is provided (e.g., visually or audibly) to the user of the electronic device.

Figure 7:
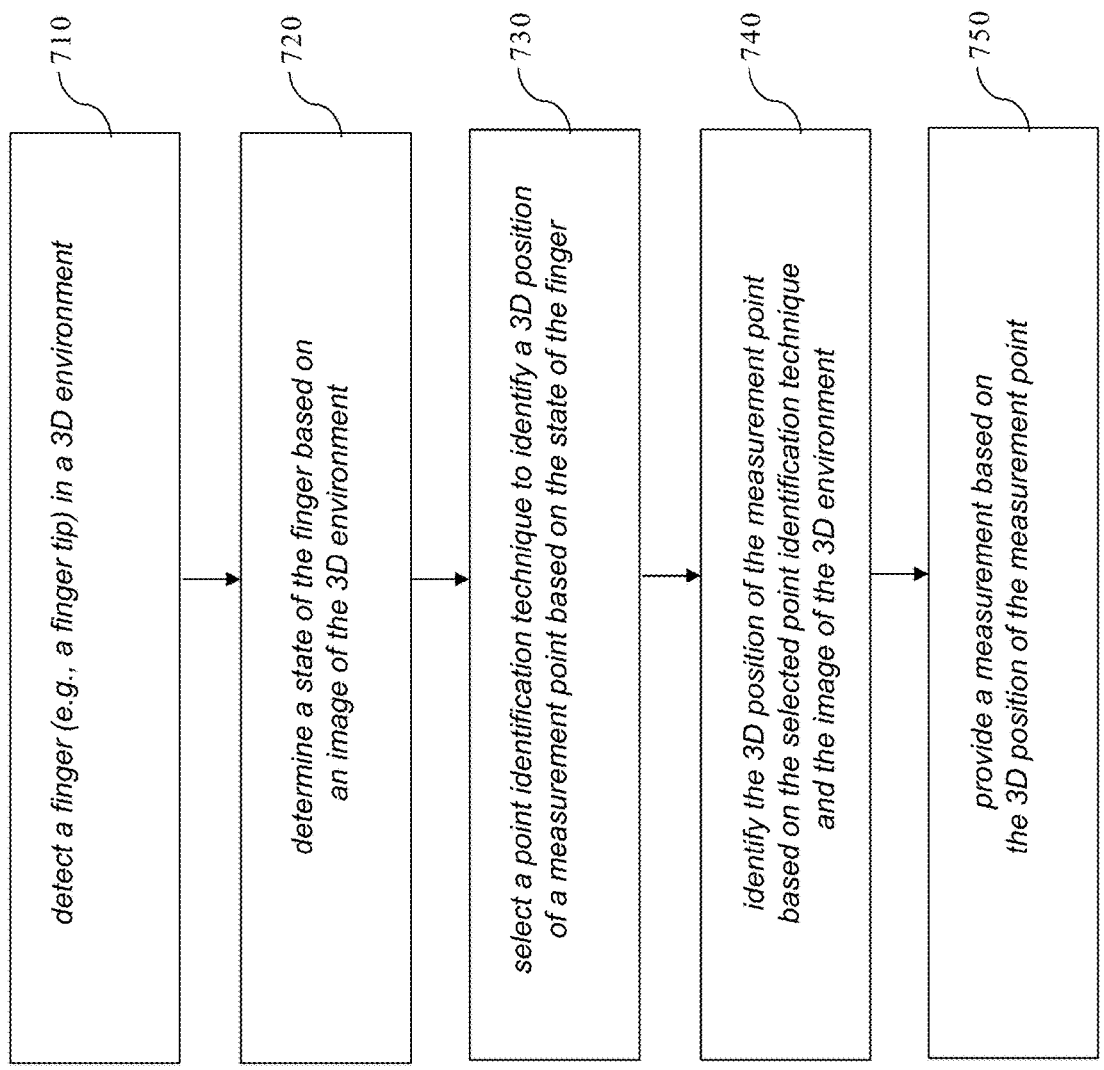
FIG. 7 is a flowchart illustrating an exemplary method of selecting a point identification technique to use to identify a 3D position of a measurement point to enable measurement of an object in a 3D environment in accordance with some implementations.

FIG. 7 is a flowchart illustrating an exemplary method of selecting a point identification technique to use to identify a 3D position of a measurement point to enable measurement of an object in a 3D environment. In some implementations, the point identification technique may select/switch between a finger touching measurement technique and a finger line-of-sight measurement technique. In some implementations, the point identification technique is selected or switched based on physical proximity.

At block 710, the method 700 detects a finger (e.g., a fingertip) in a 3D environment. In some implementations, the finger is detected in an image of the 3D environment. In some implementations, the finger is detected in the series of images. In some implementations, the finger is detected in one or more images based on any combination of color/shape, machine learning classification, template (fingertip)

matching; skin detection, hand detection, depth, or hand/finger tracking. In some implementations, image detection of the finger is implemented using various image processing techniques. In one implementation, stereo image sensors may be provided and the stereo vision provides detection and tracking (e.g., triangulation) of the fingertip of the finger. Additional techniques for detecting the finger may be used, see for example, block 230

At block 720, the method 700 determines a state of the finger based on an image of the 3D environment. In some implementations, the state of the finger is determined to be in a first finger state or in a second finger state. In some implementations at block 720, the method 700 determines whether the state of the finger is touching an object in the 3D environment or pointing to the object in the 3D environment. In some implementations, the state of the finger can switch between the state of touching an object and the state of pointing at the object (e.g., whether the finger is in the air or touching a surface).

In some implementations, the finger state of touching and the finger state of pointing are determined based on one or more images of the finger in the 3D environment. In some implementations, the first finger state of touching and the second finger state of pointing are determined (i) using a deep learning classification, (ii) using depth around a tip of the finger in the 3D environment and a depth of the fingertip, (iii) evaluating an appearance or a positioning of the finger relative to a mobile electronic device, (iv) detecting a shadow of the finger, (v) evaluating skin deformation or color modification of the finger when touching, or (vi) estimating whether a surface of interest is close to the finger using depth estimation and gaze tracking. Additional techniques for determining the finger state may be used, see for example, block 440.

At block 730, the method 700 selects a point identification technique to identify a 3D position of a measurement point based on the state of the finger. In some implementations, point identification technique is either a first point identification technique or a second point identification technique based on the state of the finger. In some implementations, the point identification technique is either a touching point identification technique or a pointing point identification technique based on the state of the finger.

At block 740, the method 700 identifies the 3D position of the measurement point based on the selected point identification technique and the image of the 3D environment. For example, the touching point identification technique identifies an object in the 3D environment adjacent to a fingertip of the finger to determine the 3D position of the measurement point. In some implementations, the first touching point identification technique identifies the touched object to be measured based on the 3D position of a fingertip (see for example, block 470). In another example, the second pointing point identification technique extends a line from a viewpoint (e.g., measuring eye) through a fingertip of the finger in the 3D environment, and determines an intersection of the line and an object in the 3D environment. In some implementations, the second pointing point identification technique identifies the distant object to be measured based on the alignment with the fingertip (see for example, block 450).

At block 750, the method 700 provides a measurement based on the 3D position of the measurement point. In some implementations, the measurement is a distance to the object from the user. In some implementations, the measurement is the distance between a first measurement point and a second measurement point or two objects in a 3D environment. In some implementations, the measurement is the area of a surface or a volume defined by a plurality of measurement points. In some implementations, both states of the finger may use line-of-sight measuring to determine the 3D coordinates of the measurement point or to provide the measurement.

In some implementations, blocks 710-750 may be repeated to obtain additional measurement points as needed to measure a distance, surface or volume. In some implementations, the state of the finger can switch between the state of touching an object and the state of pointing at the object (e.g., whether the finger is in the air or touching a surface). In some implementations, blocks 740 and 750 may be repeated to obtain additional measurement points as needed to measure a distance, surface or volume. In some implementations, a set of a plurality of measurement points is determined, and the set of measurement points is used to provide the measurement. In some implementations, feedback is provided to the user as each measurement point is determined. In some implementations, the user confirms or rejects each measurement point when determined.

Figure 8:
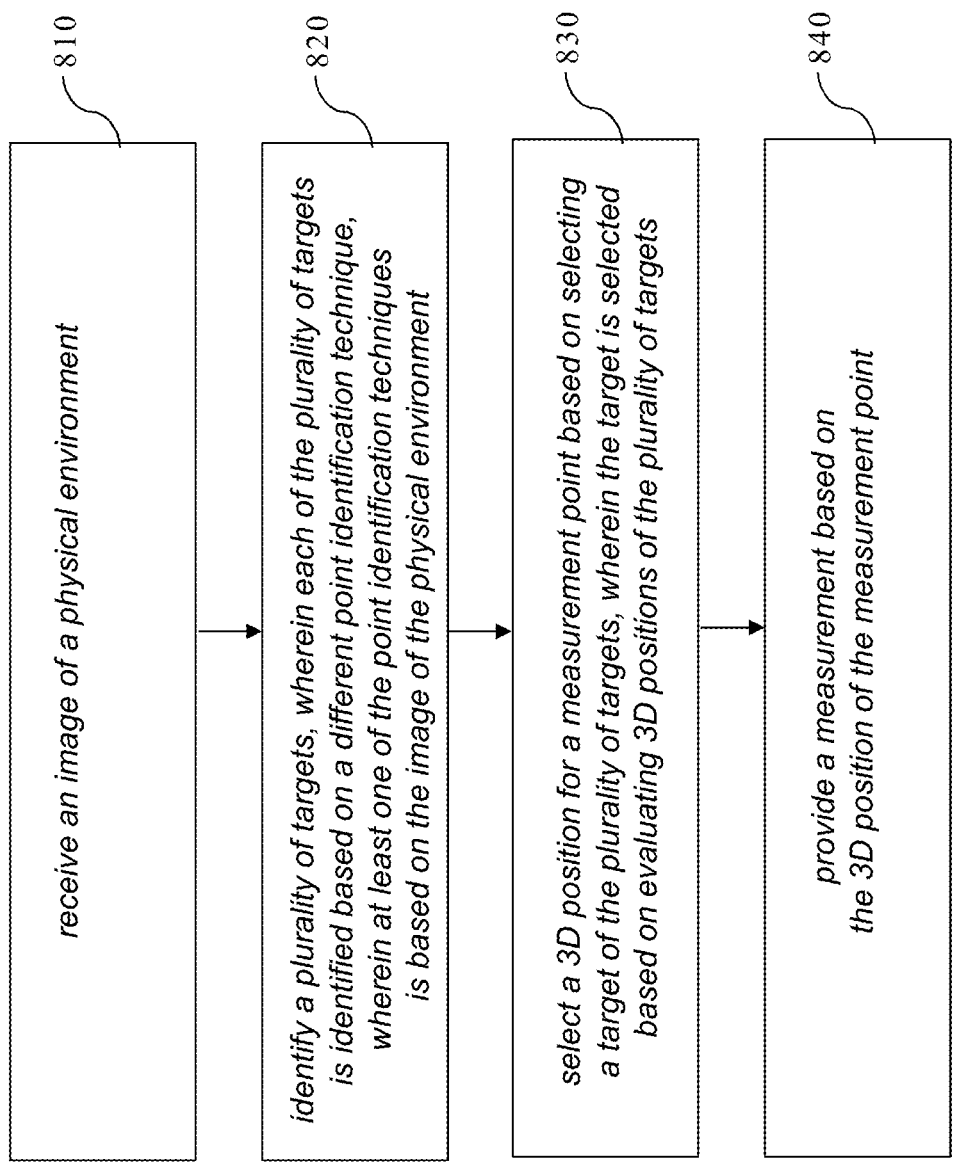
FIG. 8 is a flowchart illustrating an exemplary method of identifying a 3D position of a measurement point to enable measurement of an object in a 3D environment, where the measurement point is identified by selecting from multiple targets that are determined using different point selection techniques in accordance with some implementations.

FIG. 8 is a flowchart illustrating an exemplary method of identifying a 3D position of a measurement point to enable measurement of an object in a 3D environment, where the measurement point is identified by selecting from multiple targets (e.g., possibilities) that are determined using different point selection techniques (e.g., measuring modalities). In some implementations, the selection among the multiple targets is based on an evaluation of likelihood that each different target is the 3D position of the measurement point.

At block 810, the method 800 receives an image of a physical environment. In some implementations, a plurality of images of the physical environment are received.

At block 820, the method 800 identifies a plurality of targets (e.g., multiple possible 3D positions of a measurement point), wherein each of the plurality of targets is identified based on a different point identification technique. In some implementations, at least one of the point identification techniques is based on the image of the physical environment. In some implementations, the point identification techniques may correspond to different user measurement interaction modes. For example, the point identification modes may include (a) a finger-based point identification technique, (b) an active gaze-based point identification technique, (c) a controller-based point identification technique, (d) a fixed crosshair-based point identification technique, and (e) a line of sight-based point identification technique.

At block 830, the method 800 selects a 3D position for a measurement point based on selecting a target of the plurality of targets, wherein the target is selected based on evaluating 3D positions of the plurality of targets. In some implementations, evaluating 3D positions of the plurality of targets involve evaluating the likelihood that each target has characteristics of a measurement target. Thus, each of the plurality of targets may be considered a candidate 3D position of the measurement point. In some implementations, a 3D position for a measurement point is selected from a plurality of targets, wherein selection is made according to the likelihood of belonging to a measurement target. In some implementations, evaluating whether each target has characteristics of the selected target (e.g., measurement point) includes evaluating the likelihood that each target is the measurement point. In some implementations, evaluating the likelihood that each target is the measurement point uses aspects corresponding to user interaction with the 3D positions of the plurality of targets. In some implementations, user interactions with the 3D positions of the plurality of targets includes finger appearance, movement of at least the finger, finger state, eye state, or detected gestures. In some implementations, evaluating the likelihood that each target is the measurement point is based on semantic information of 3D environment. In some implementations, evaluating the likelihood that each target is the measurement point is based on the spatial characteristics of the 3D environment or physical characteristics of the 3D positions of the plurality of targets including corners, edges, lines, gradient information, 3D shape information, or depth. Additional techniques for selecting a 3D position for a measurement point based on selecting a target of the plurality of targets may be used, see for example, FIG. 5.

At block 840, the method 800 provides a measurement based on the 3D position of the measurement point. In some implementations, the measurement is a distance, an area of a surface or a volume defined by one or more measurement points. In some implementations, blocks 810-840 may be repeated to obtain additional measurement points before a selection among measurement techniques is made. In some implementations, blocks 810-840 may be repeated to obtain additional measurement points as needed to measure a distance, surface or volume. In some implementations, a set of a plurality of measurement points is determined, and the set of measurement points is used to provide the measurement. In some implementations, the user confirms or rejects each measurement point when determined.

Figure 12:
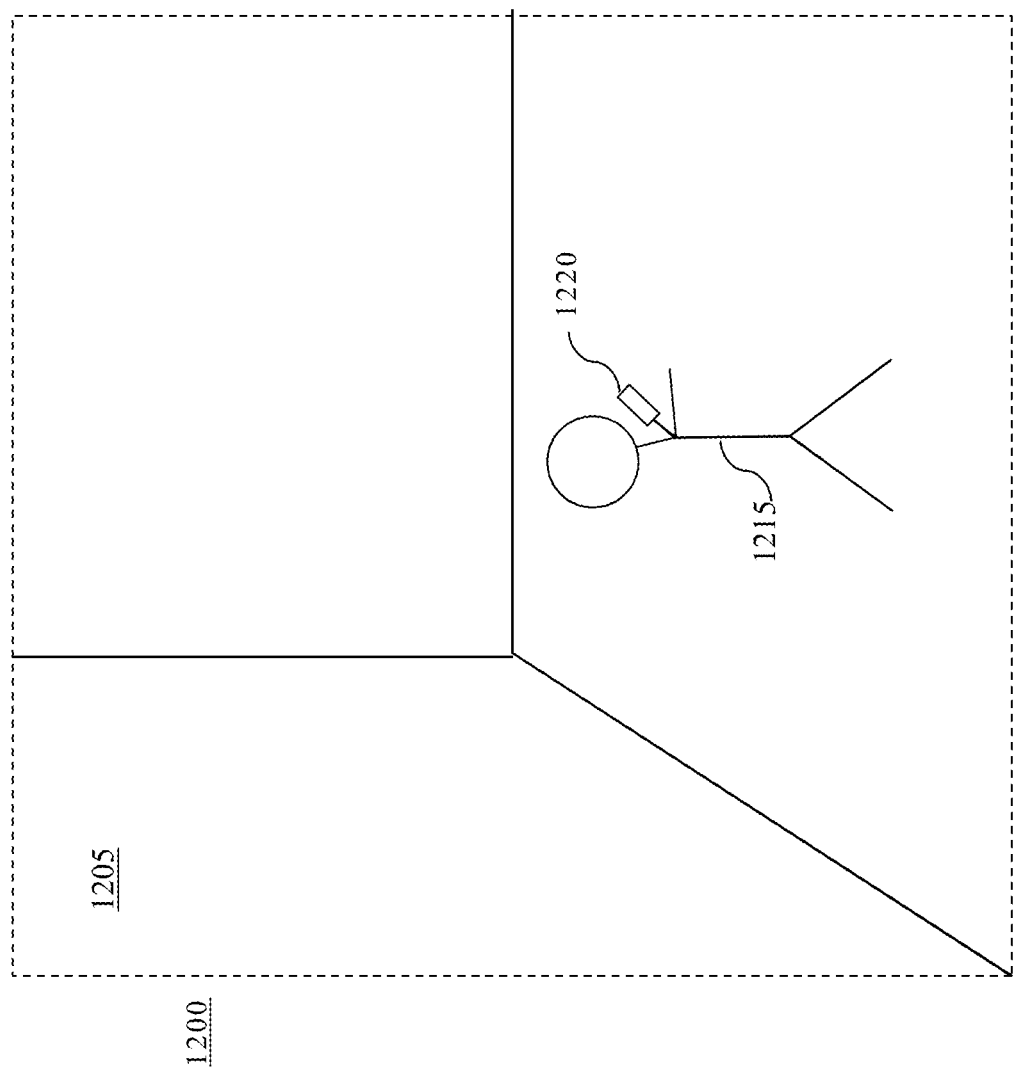
FIG. 12 illustrates an example operating environment in accordance with some implementations.
Figure 13:
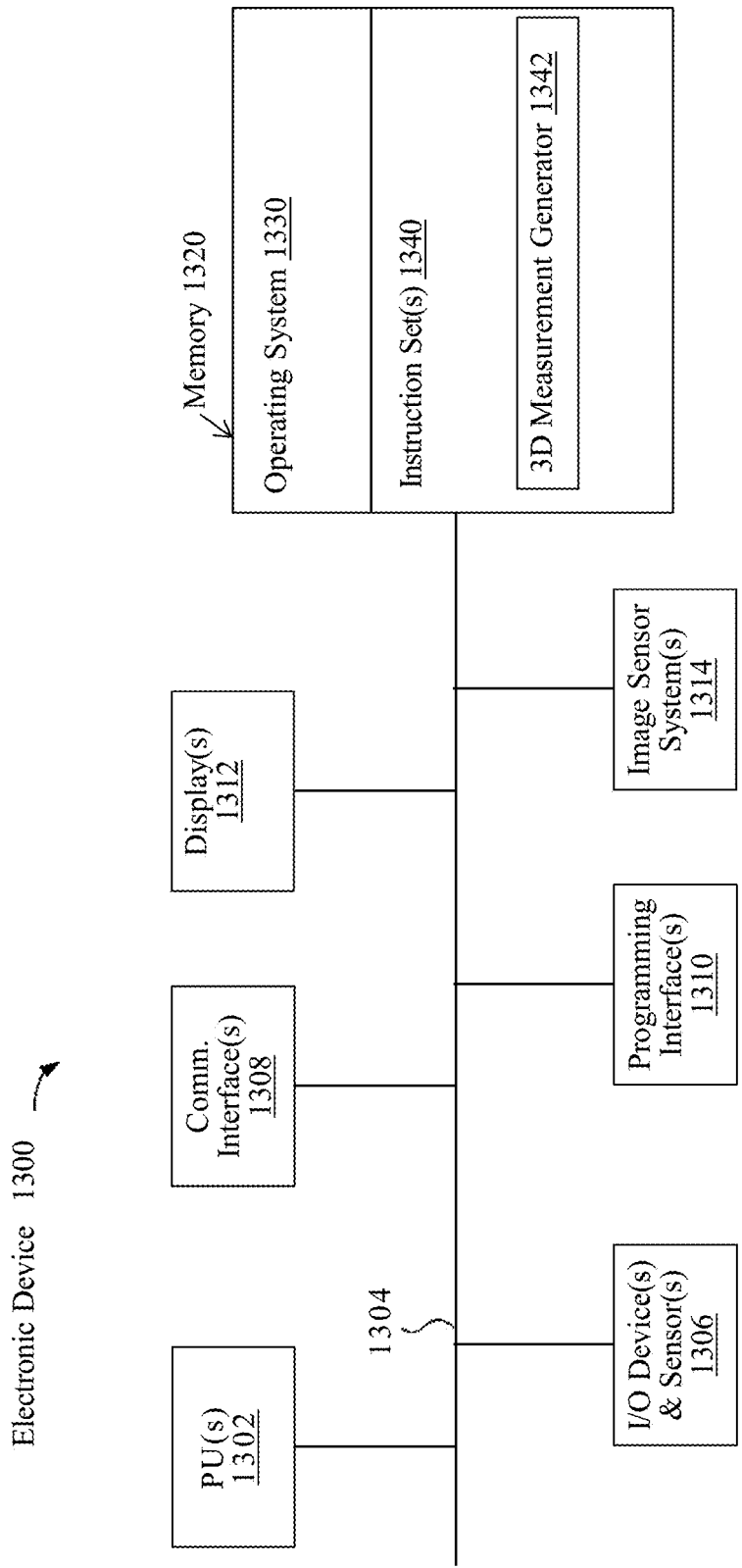
FIG. 13 illustrates an example electronic device in accordance with some implementations.

In some implementations, the methods 200, 400, 600, 700, and 800 are performed by a device (e.g., electronic device 1220, 1200 of FIGS. 12 and 13). The methods 200, 400, 600, 700, and 800 can be performed using an electronic device or by multiple devices in communication with one another. In some implementations, the methods 200, 400, 600, 700, and 800 are performed by processing logic, including hardware, firmware, software, or a combination thereof In some implementations, the methods 200, 400, 600, 700, and 800 are performed by a processor executing code stored in a non-transitory computer-readable medium (e.g., a memory). In some implementations, the methods 200, 400, 600, 700, and 800 are performed by an electronic device having a processor.

Although various measurement techniques described herein are each applicable to various electronic devices including but not limited to mobile electronic devices, smart phones, touchscreen-based personal computers, tablets, HMDs (e.g., optical/video views), etc.

Figure 9:
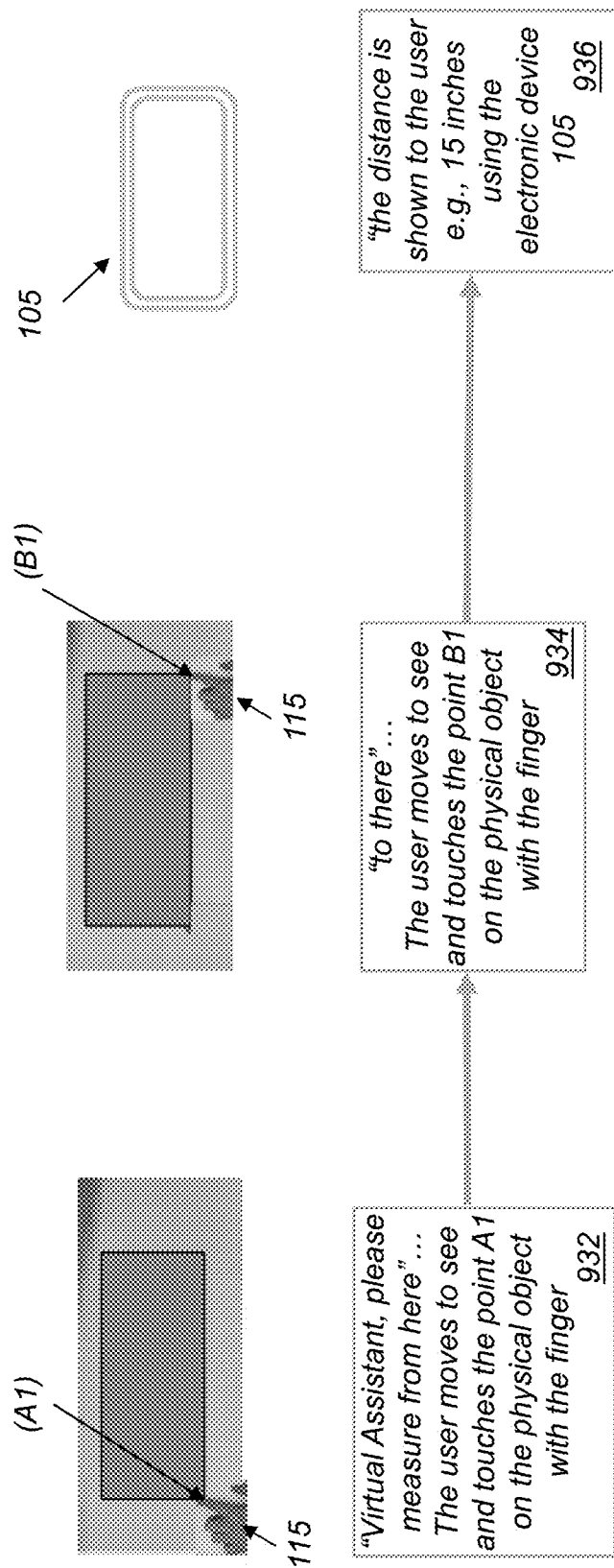
FIG. 9 illustrates an exemplary finger-touching measurement technique in a 3D environment using an electronic device in accordance with some implementations.

FIG. 9 illustrates an exemplary finger-touching measurement technique in a 3D environment using an electronic device in accordance with some implementations. As shown in FIG. 9, an example voice assisted finger touching measurement technique 110 is performed using the electronic device 105. First, the user 115 moves to see and touch a first point A1 on a physical object (e.g., a corner) and says "Virtual Assistant, please measure from here . . . ". Second, the user 115 moves to see and touch a second point B1 on the physical object and says "to here". The two measurement points determine the distance between "here" and "there", which is shown to the user 115. For example, the distance may be displayed as a number with units in a highlighted text box to the user. Alternatively, the 3D point A, a line, and the 3D point B are virtual objects shown to the user 115 with the distance shown next to the line. In some implementations, an audible response is provided to the user 115 by the electronic device 105 (e.g., the Virtual Assistant says "the distance is 15 inches, please acknowledge"). In some implementations, sensors of the electronic device 105 are used to assist in an exemplary finger-touching measurement technique 110.

In some implementations, the measurement technique 110 uses a temporal indication and a physical indication to perform the measurement. Thus, as shown in FIG. 9, when the virtual assistant is activated and determines that the finger-touching measurement technique 110 is to be used, tracking (e.g., at least an image sensor) and odometry are enabled (e.g., movement sensors, VIO, SLAM, etc.). For the first step 932, the finger (e.g., fingertip) of the user 115 is detected in one or more images and a first 3D coordinate of the fingertip is determined. For the second step 934, the finger of the user 115 is again detected and the second 3D coordinate on the fingertip is determined. Then, in the next step 936, the distance is shown to the user with the electronic device 105, and the tracking and odometry are disabled.

Figure 10:
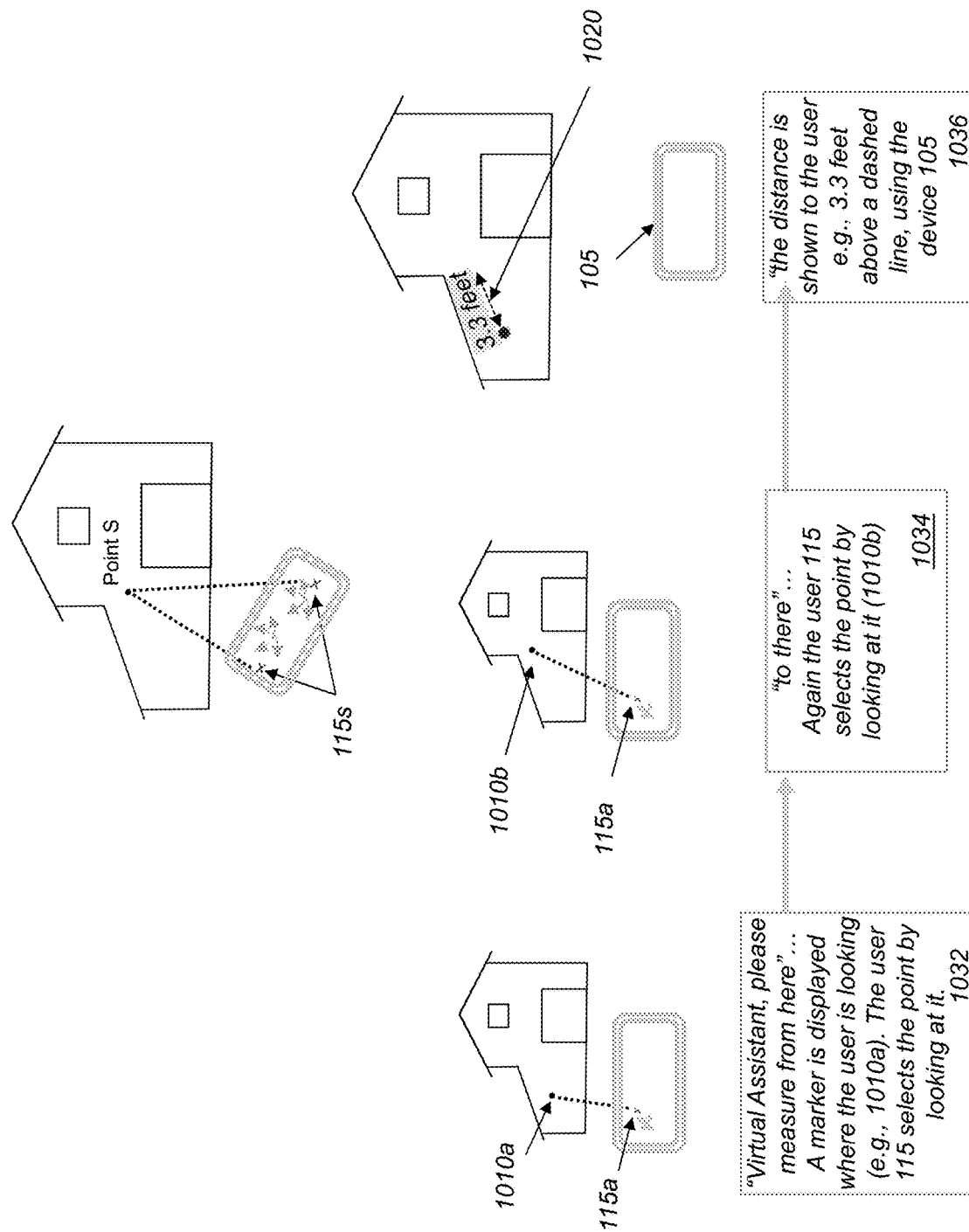
FIG. 10 illustrates an exemplary active gaze measurement technique in a 3D environment using an electronic device in accordance with some implementations.

FIG. 10 illustrates an exemplary active gaze measurement technique in a 3D environment using an electronic device in accordance with some implementations. As shown in FIG. 10, an example voice-assisted active gaze measurement technique 120 is performed using the electronic device 105. In one implementation, initially the user 115 says "Virtual Assistant, please measure from here . . . " and selects the point by looking at the point (e.g., point 1010a). Second, the user 115 says "to there" and selects the second point by looking at the second point (e.g., point 1010b).

In some implementations, the measurement techniques 120 use both a temporal indication and a physical indication. Thus, as shown in FIG. 10, when the virtual assistant is activated and determines that the active gaze measurement technique 120 is to be used, active gaze and odometry are enabled. For the first step 1032, a gaze direction of a measuring eye 115a of the user 115 is determined and a marker 1010a is displayed where an intersection of the gaze direction with the 3D environment determines the 3D coordinates of the marker 1010a. For the second step 1034, a marker 1010b is displayed at the gaze direction of the measuring eye 115a and an intersection of the gaze direction with the 3D environment determines the 3D coordinates of the second marker 1010b. Then, in the next step 1036, the distance 1020 is shown to the user with the electronic device 105, and the active gaze and odometry are disabled. In some implementations, the dashed line with distance 1020 are virtual objects.

In some implementations, stereo active gaze measuring techniques 120 may be used. For example, as shown in FIG. 10, the user 115 may enable the measuring technique using the virtual assistant and selects a point of interest by looking at the point of interest. In this case, the intersection of the gaze direction of both eyes 115s of the user 115 determine stereo gazes that determines the 3D coordinates of the point of interest, point S.

Figure 11:
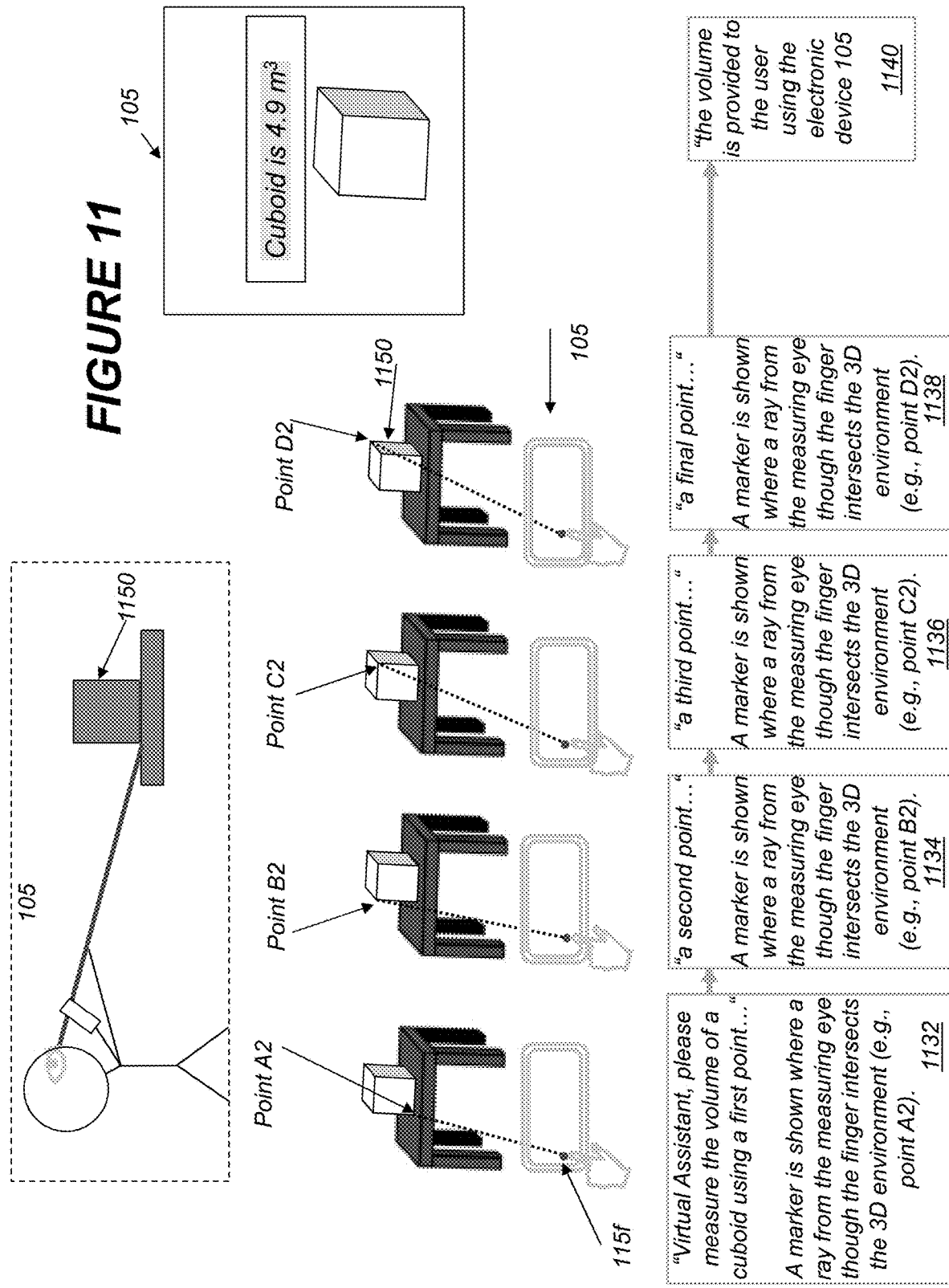
FIG. 11 illustrates an exemplary line of sight-based measurement technique in a 3D environment using an electronic device in accordance with some implementations.

FIG. 11 illustrates an exemplary line of sight-based measurement technique in a 3D environment using an electronic device in accordance with some implementations. As shown in FIG. 11, an example voice-assisted line of sight-based measurement technique 150 is performed using the electronic device 105. In one implementation, first a user 115 says "Virtual Assistant, please measure a volume of a cuboid using a first point . . . " and selects the point by aligning the fingertip 115f to the point (e.g., point A2) using a measuring eye 115a. Second, the user 115 says "a second point" and selects the second point by point by aligning the fingertip 115f to the second point (e.g., point B2) using the measuring eye 115a. Third, the user 115 says "a third point" and selects the third point by point by aligning the fingertip 115f to the third point (e.g., point C2) using the measuring eye 115a. Fourth, the user 115 says "a fourth point" and selects the fourth point by point by aligning the fingertip 115f to the fourth point (e.g., point D2) using the measuring eye 115a.

As shown in FIG. 11, when the virtual assistant is activated and determines that line of sight-based measurement technique 150 is to be used, tracking of at least 1 measuring eye, tracking the finger, and odometry are enabled. For the first step 1132, a position of the measuring eye 115a of the user 115 is determined, a 3D position of the fingertip 115f is determined, and a line extending from the measuring eye though the fingertip 115f intersects the 3D environment to determine 3D coordinates of a first point A2 (e.g., marker). This process is repeated in a second step 1134 for the second point B2, in a third step 1136 for the third point C2, and in a final and fourth step 1138 for the fourth point D2. Then, in the next step 1140, the four measurement points determine the volume of the cuboid 1150, which is provided (Cuboid is 4.9 m$^3$) to the user 115 with the electronic device 105. Once the volume is determined and provided to the user 115, the tracking and odometry may be disabled. In some implementations, a gaze direction of the measuring eye 115a and the 3D position of the finger is used in LOS-based measurement techniques 150.

FIG. 12 illustrates an example operating environment 1200 in which electronic device 1220 is used in physical environment 1205. A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In the example of FIG. 12, the device 1220 is illustrated as a single device. Some implementations of the device 1220 are hand-held. For example, the device 1220 may be a mobile phone, a tablet, a laptop, and so forth. In some implementations, the device 1220 is worn by a user 1215. For example, the device 1220 may be a watch, a smartphone, a tablet, and so forth. In some implementations, functions of the device 1220 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 1220 may communicate with one another via wired or wireless communications.

FIG. 13 is a block diagram of an example device 1300. Device 1300 illustrates an exemplary device configuration for the device 1220. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1300 includes one or more processing units 1302 (e.g., microprocessors, ASICs, FPGAs, GPUs, CPUs, processing cores, or the like), one or more input/output (I/O) devices and sensors 1306, one or more communication interfaces 1308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1310, one or more displays 1312, one or more interior or exterior facing sensor systems 1314, a memory 1320, and one or more communication buses 1304 for interconnecting these and various other components.

In some implementations, the one or more communication buses 1304 include circuitry that interconnects and controls communications between system components. In some implementations, the one or more I/O devices and sensors 1306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 1312 are configured to present content to the user. In some implementations, the one or more displays 1312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), or the like display types. In some implementations, the one or more displays 1312 correspond to diffractive, reflective, polarized, holographic, etc. waveguide displays. For example, the electronic device 1300 may include a single display. In another example, the electronic device 1300 includes a display for each eye of the user.

In some implementations, the one or more interior or exterior facing sensor systems 1314 include an image capture device or array that captures image data or an audio capture device or array (e.g., microphone) that captures audio data. The one or more image sensor systems 1314 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 1314 further include an illumination source that emits light such as a flash. In some implementations, the one or more image sensor systems 1314 further include an on-camera image signal processor (ISP) configured to execute a plurality of processing operations on the image data.

The memory 1320 includes high-speed random-access memory, such as DRAM, SRAM, DDR RAM, or other random-access solid-state memory devices. In some implementations, the memory 1320 includes non-volatile memory, such as one or more magnetic disk storage devices, optical disk storage devices, flash memory devices, or other non-volatile solid-state storage devices. The memory 1320 optionally includes one or more storage devices remotely located from the one or more processing units 1302. The memory 1320 comprises a non-transitory computer readable storage medium.

In some implementations, the memory 1320 or the non-transitory computer readable storage medium of the memory 1320 stores an optional operating system 1330 and one or more instruction set(s) 1340. The operating system 1330 includes procedures for handling various basic system services and for performing hardware dependent tasks. In some implementations, the instruction set(s) 1340 include executable software defined by binary information stored in the form of electrical charge. In some implementations, the instruction set(s) 1340 are software that is executable by the one or more processing units 1302 to carry out one or more of the techniques described herein.

In some implementations, the instruction set(s) 1340 include a 3D measurement generator 1342 that is executable by the processing unit(s) 1302 to determine measurements in a 3D environment according to one or more of the techniques disclosed herein.

Although the instruction set(s) 1340 are shown as residing on a single device, it should be understood that in other implementations, any combination of the elements may be located in separate computing devices. FIG. 13 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a processor:
detecting a finger in a 3D environment;
determining, based on an image of the 3D environment, a 3D position of a measurement point based on whether the finger is at least a first threshold distance away from the measurement point and whether the finger is within a second threshold distance to the measurement point, wherein the first threshold distance is larger than the second threshold distance, wherein if the finger is determined to be at least the first threshold distance away from the measurement point, the 3D position of the measurement point is determined based on a 3D position of the finger and a 3D position of an eye of a user, and if the finger is determined to be within the second threshold distance to the measurement point, the 3D position of the measurement point is determined based on the 3D position of the finger; and
providing a measurement based on the 3D position of the measurement point.

2. The method of claim 1, wherein detecting the finger comprises detecting the finger in an image of the 3D environment based on color, shape, or connection to an arm or wrist.

3. The method of claim 1, further comprising determining whether the finger is at least the first threshold distance away from the measurement point and whether the finger is within the second threshold distance to the measurement point (i) using depth around a fingertip of the finger in the 3D environment and a depth of the fingertip, (ii) evaluating an appearance or a positioning of the finger relative to a mobile electronic device, (iii) detecting a shadow of the finger, (iv) evaluating skin deformation or color modification of the finger when touching, or (v) estimating a distance from a surface of interest to the finger using depth estimation and gaze tracking.

4. The method of claim 1, wherein determining the 3D position of the measurement point further comprises identifying an object in the 3D environment adjacent to a fingertip of the finger.

5. The method of claim 1, wherein the 3D position of the measurement point is determined based on the 3D position of the finger and the 3D position of the eye of the user by:
extending a line from the 3D position of the eye through the 3D position of the finger; and
determining an intersection of the line and an object in the 3D environment.

6. The method of claim 1, wherein the measurement is a distance to the measurement point, a distance between the measurement point and a second measurement point, a surface area identified based on the measurement point, or a volume identified based on the measurement point.

7. The method of claim 6, further comprising determining a set of measurement points, wherein providing the measurement is further based on the set of measurement points.

8. A system comprising:
one or more processors; and
memory storing instructions that, when executed by the one or more processors, cause the system to:
detect a finger in a 3D environment;
determine, based on an image of the 3D environment, a 3D position of a measurement point based on whether the finger is at least a first threshold distance away from the measurement point and whether the finger is within a second threshold distance to the measurement point, wherein the first threshold distance is larger than the second threshold distance, wherein if the finger is determined to be at least the first threshold distance away from the measurement point, the 3D position of the measurement point is determined based on a 3D position of the finger and a 3D position of an eye of a user, and if the finger is determined to be within the second threshold distance to the measurement point, the 3D position of the measurement point is determined based on the 3D position of the finger; and
provide a measurement based on the 3D position of the measurement point.

9. The system of claim 8, wherein the instructions, when executed, further cause the system to detect the finger in the 3D environment based on color, shape, or connection to an arm or wrist.

10. The system of claim 8, wherein the instructions, when executed, further cause the system to determine whether the finger is at least the first threshold distance away from the measurement point and whether the finger is within the second threshold distance to the measurement point based on whether the finger is touching an object in the 3D environment or whether the finger is aligned with the object in the 3D environment.

11. The system of claim 8, wherein the instructions, when executed, further cause the system to determine the 3D position of the eye of the user based on whether the eye of the user is open, is a dominant eye, or is a preselected eye.

12. The system of claim 8, wherein the instructions, when executed, further cause the system to determine the 3D position of the measurement point based on the 3D position of the finger and the 3D position of the eye of the user by:
extending a line from the 3D position of the eye through the 3D position of the finger; and
determining an intersection of the line and an object in the 3D environment.

13. The system of claim 8, wherein the measurement is a distance to the measurement point, a distance between the measurement point and a second measurement point, a surface area identified based on the measurement point, or a volume identified based on the measurement point.

14. The system of claim 13, wherein a set of a plurality of measurement points is determined, and the set of measurement points is used to provide the measurement.

15. The system of claim 8, wherein the instructions, when executed, further cause the system to determine whether the finger is at least the first threshold distance away from the measurement point and whether the finger is within the second threshold distance to the measurement point (i) using depth around a fingertip of the finger in the 3D environment and a depth of the fingertip, (ii) evaluating an appearance or a positioning of the finger relative to a mobile electronic device, (iii) detecting a shadow of the finger, (iv) evaluating skin deformation or color modification of the finger when touching, or (v) estimating a distance from a surface of interest to the finger using depth estimation and gaze tracking.

16. A computer-readable storage medium storing instructions that, when executed cause performance of:
detecting a finger in a 3D environment;

determining, based on an image of the 3D environment, whether the finger is at least a first threshold distance away from a measurement point or the finger is within a second threshold distance to the measurement point, wherein the first threshold distance is larger than the second threshold distance;

based on determining that the finger is at least the first threshold distance away from the measurement point, determining a 3D position of the measurement point based on a 3D position of the finger and a 3D position of an eye of a user;

based on determining that the finger is within the second threshold distance to the measurement point, determining the 3D position of the measurement point based on the 3D position of the finger; and providing a measurement based on the 3D position of the measurement point.

17. The storage medium of claim 16, wherein detecting the finger in the 3D environment is based on color, shape, or connection to an arm or wrist.

18. The storage medium of claim 16, further storing instructions that, when executed, further cause determining whether the finger is touching an object in the 3D environment or whether the finger is aligned with the object in the 3D environment.

19. The storage medium of claim 16, further comprising instructions that, when executed, further cause determining the 3D position of the eye of the user based on whether the eye of the user is open, is a dominant eye, or is a preselected eye.

20. The storage medium of claim 16, further comprising instructions that, when executed, further cause determining the 3D position of the measurement point based on the 3D position of the finger and the 3D position of the eye of the user by:

extending a line from the 3D position of the eye through the 3D position of the finger; and determining an intersection of the line and an object in the 3D environment.

* * * * *